No. 670,191. Patented Mar. 19, 1901.
E. W. APPLEGATE.
CASH REGISTER.
(Application filed Apr. 17, 1899.)
(No Model.) 6 Sheets—Sheet 2.
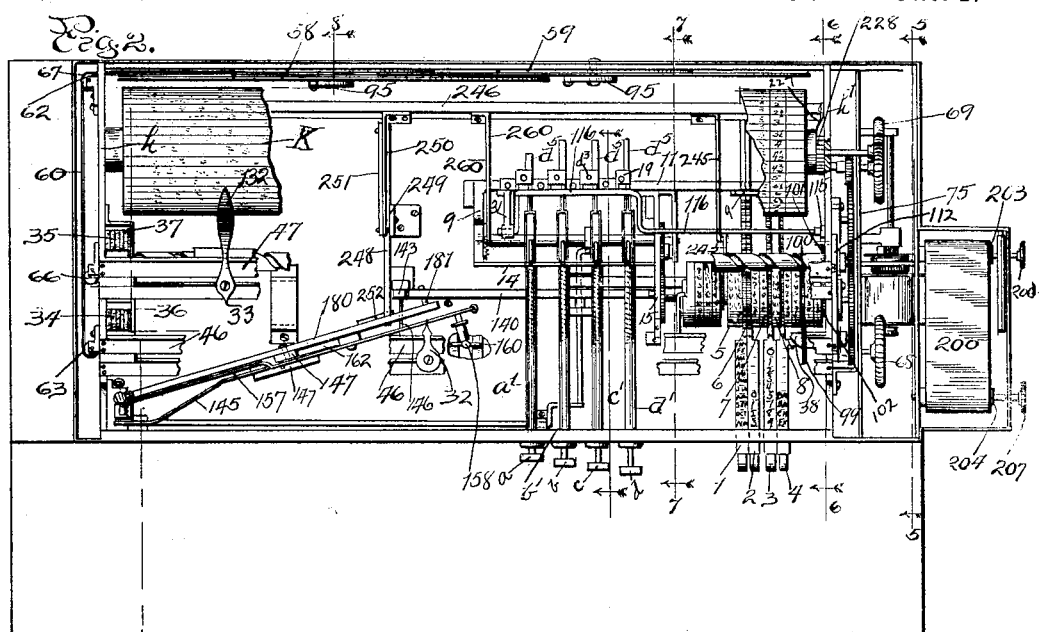
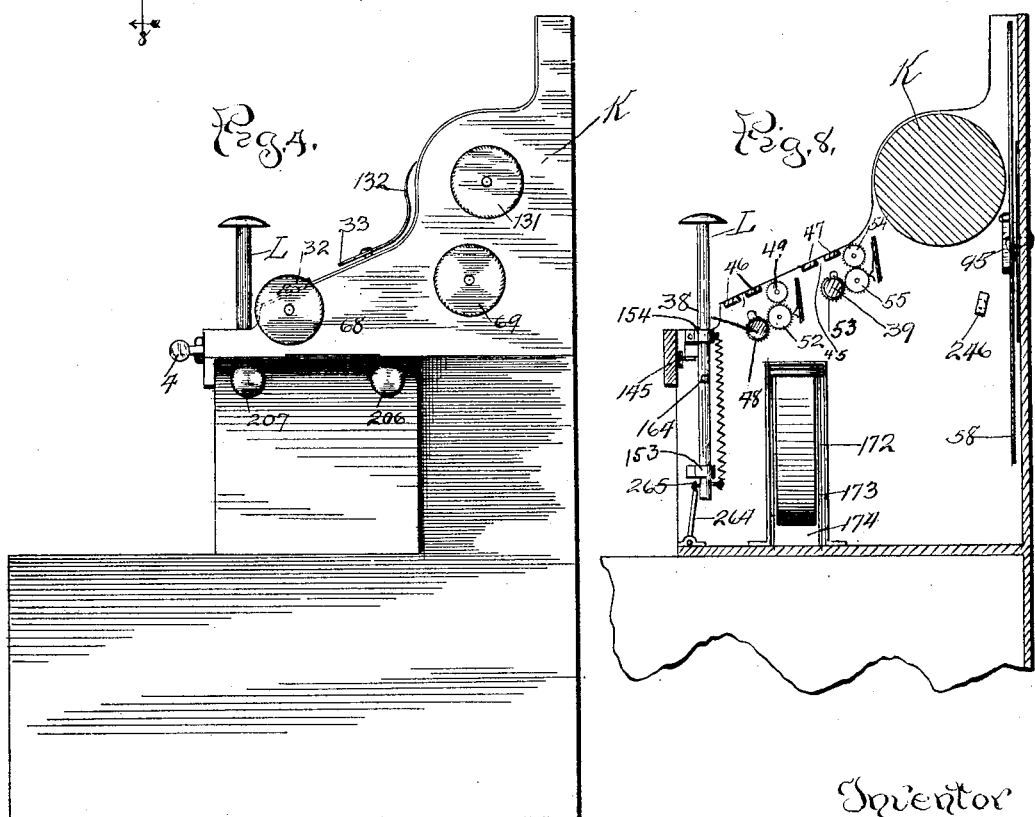
Witnesses
Inventor
Eugene W. Applegate,
by A. Miller Belfield,
Atty.

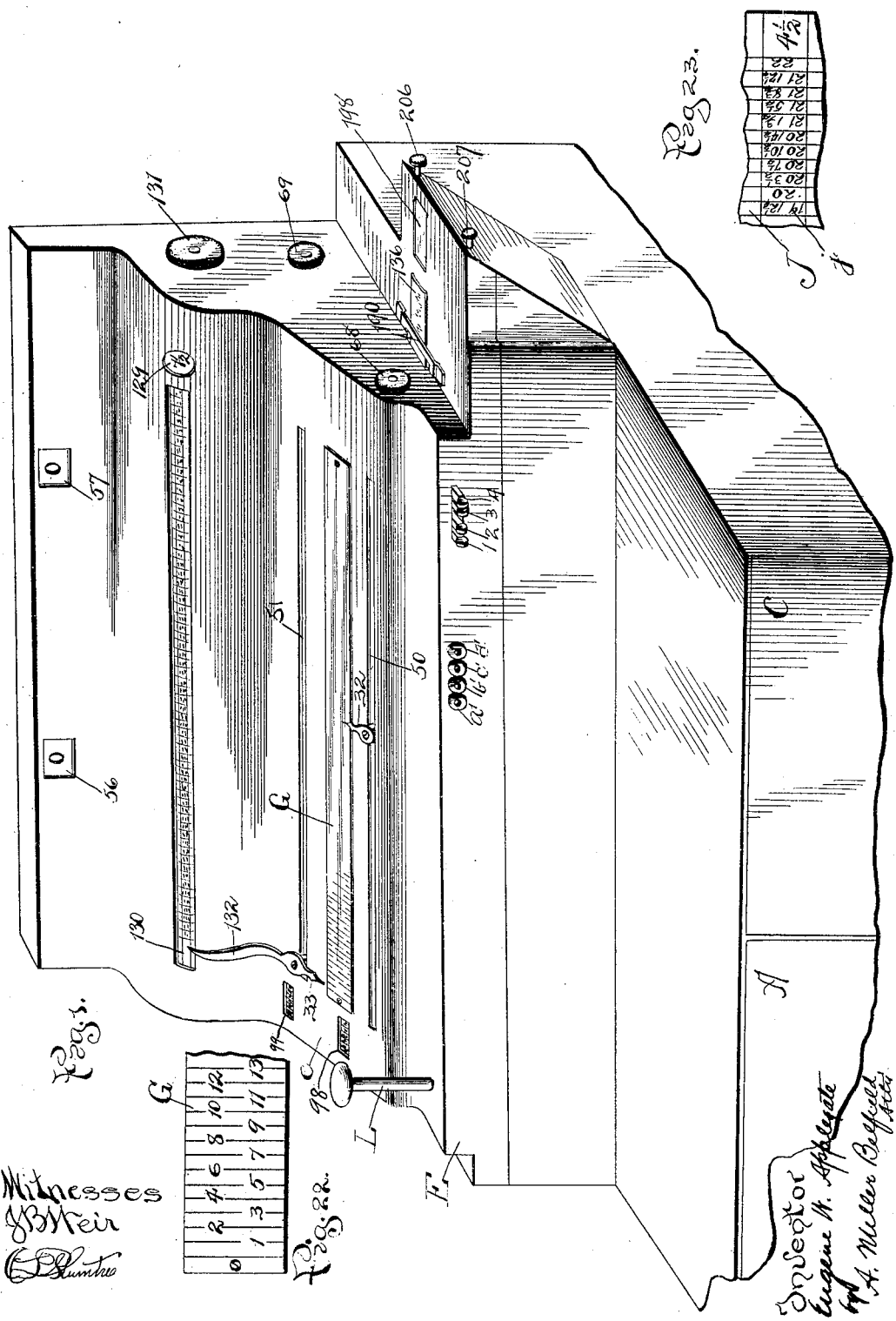

No. 670,191. Patented Mar. 19, 1901.
E. W. APPLEGATE.
CASH REGISTER.
(Application filed Apr. 17, 1899.)
(No Model.) 6 Sheets—Sheet 3.
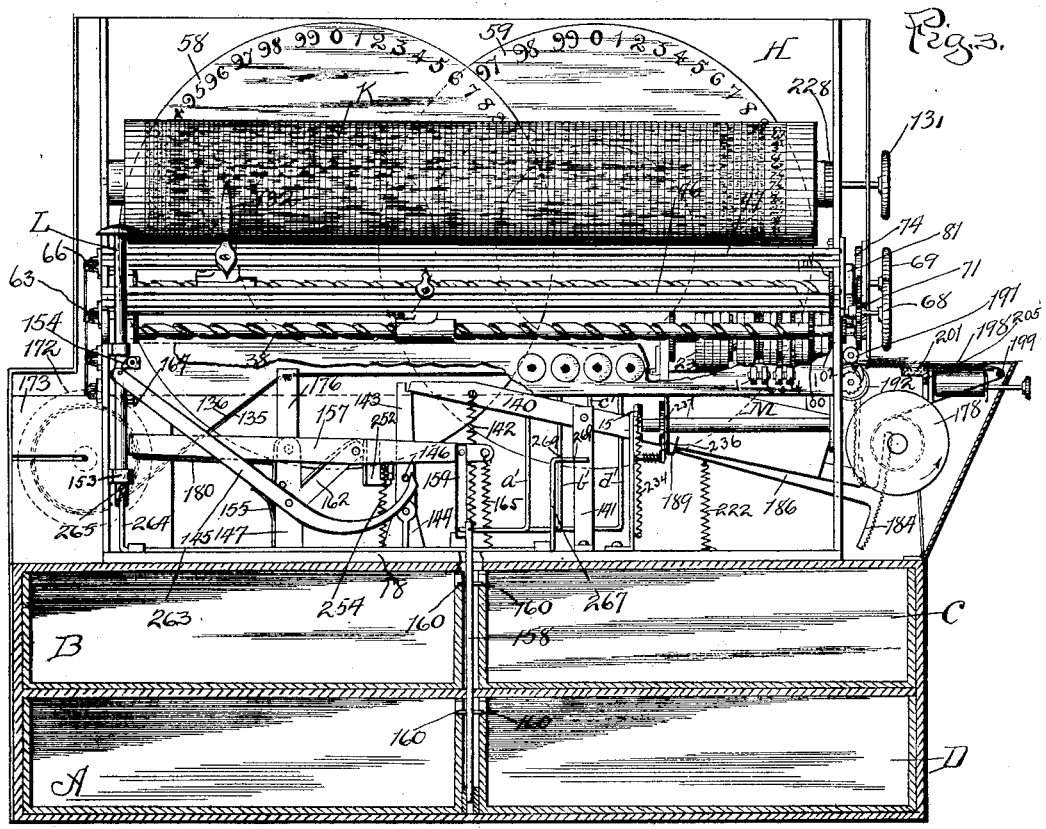
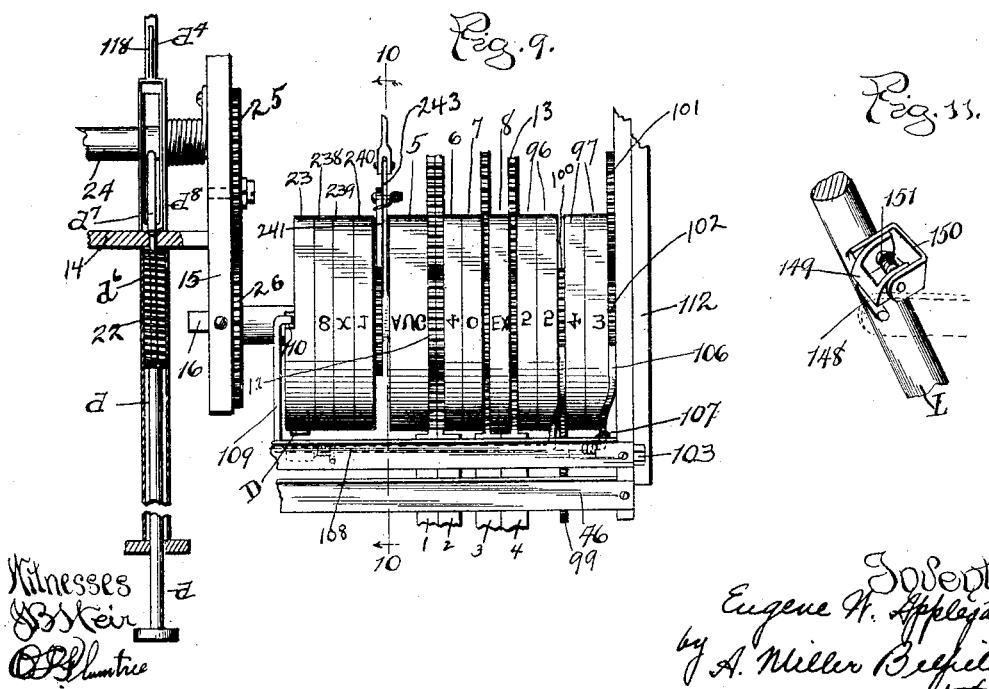
Witnesses
Inventor
Eugene W. Applegate
by A. Miller Belfield
Atty.

No. 670,191. Patented Mar. 19, 1901.
E. W. APPLEGATE.
CASH REGISTER.
(Application filed Apr. 17, 1899.)
(No Model.) 6 Sheets—Sheet 4.
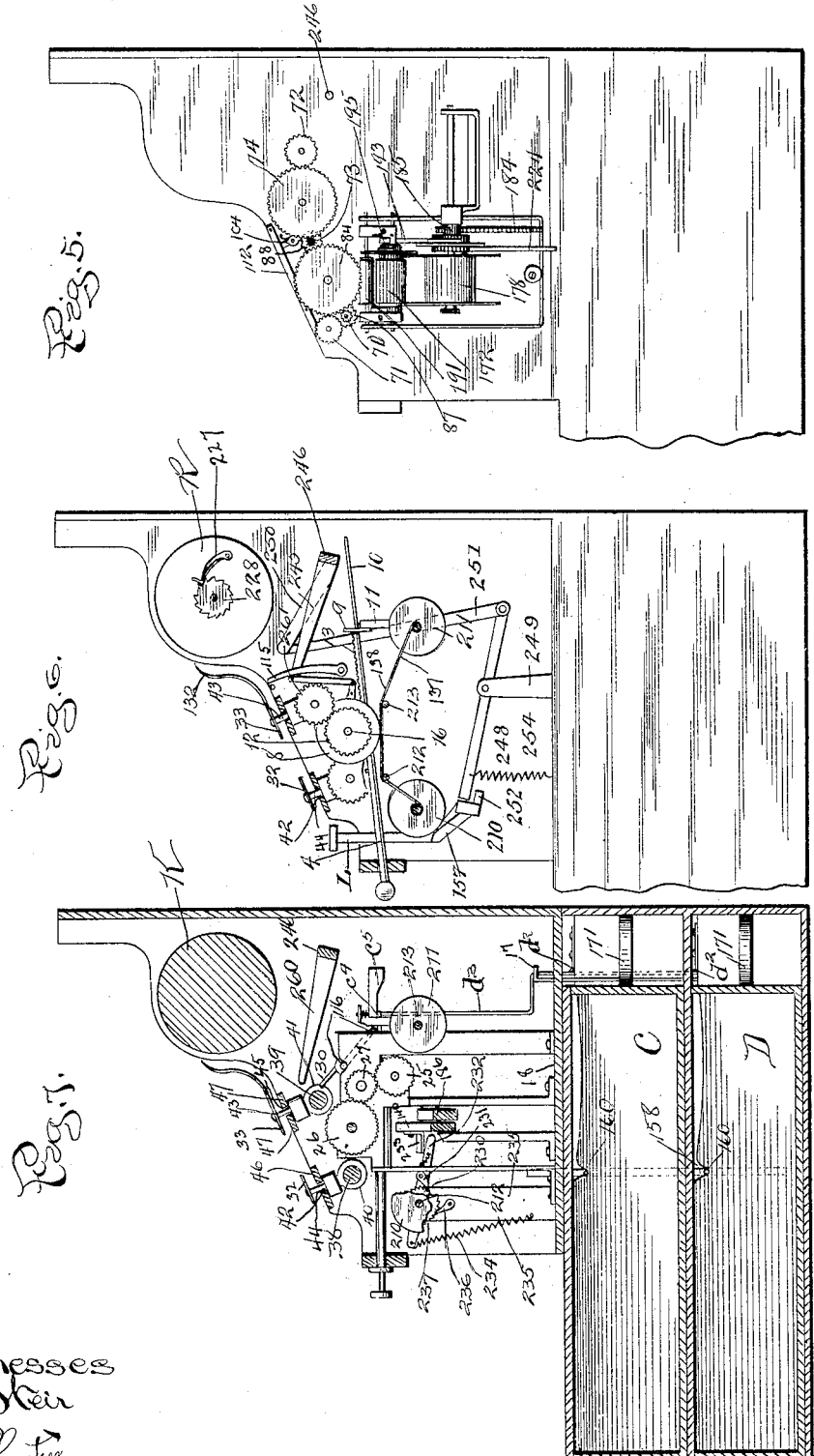

No. 670,191. Patented Mar. 19, 1901.
E. W. APPLEGATE.
CASH REGISTER.
(Application filed Apr. 17, 1899.)
(No Model.) 6 Sheets—Sheet 5.
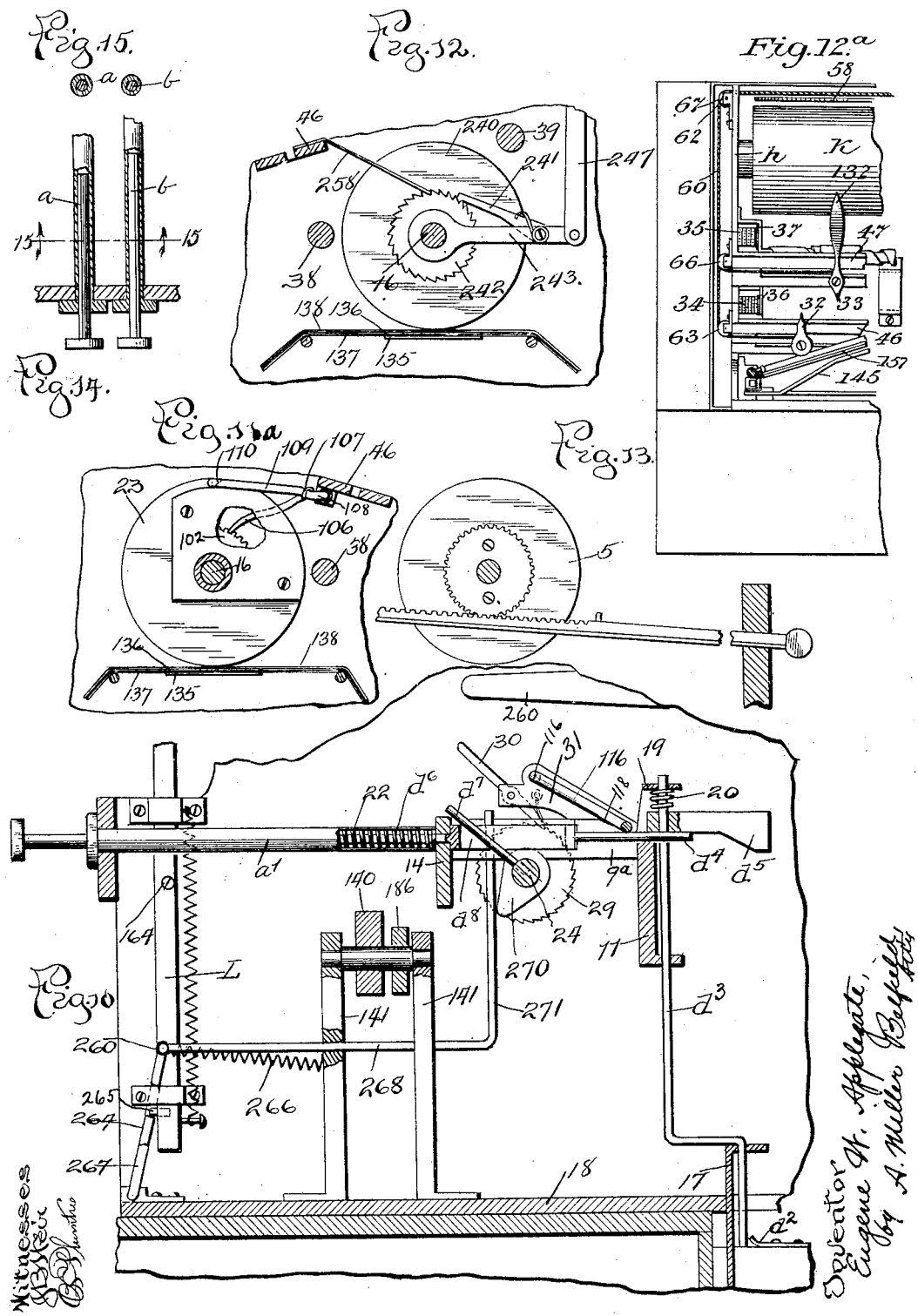

No. 670,191. Patented Mar. 19, 1901.
E. W. APPLEGATE.
CASH REGISTER.
(Application filed Apr. 17, 1899.)
(No Model.) 6 Sheets—Sheet 6.
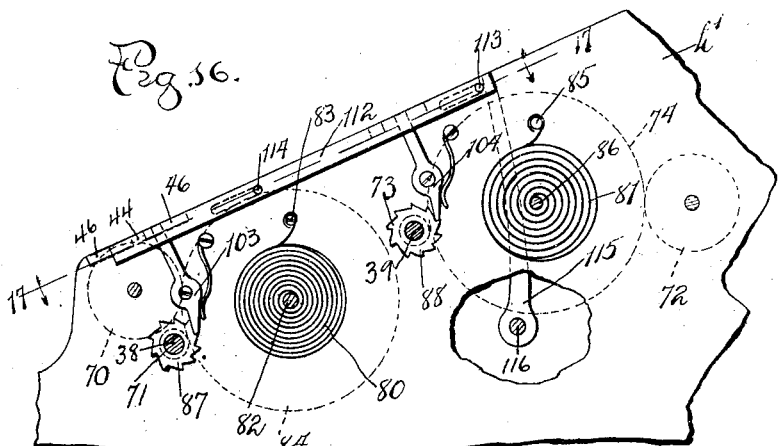
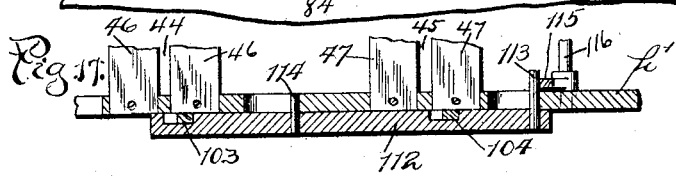
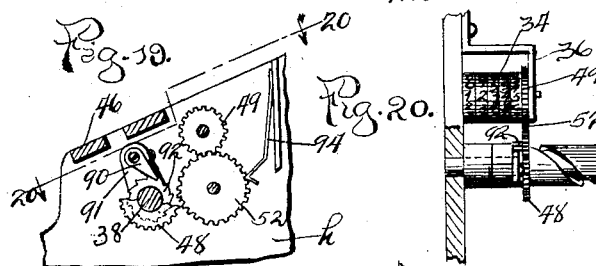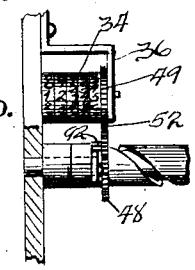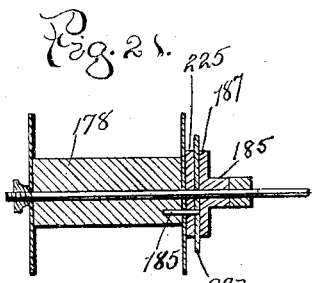
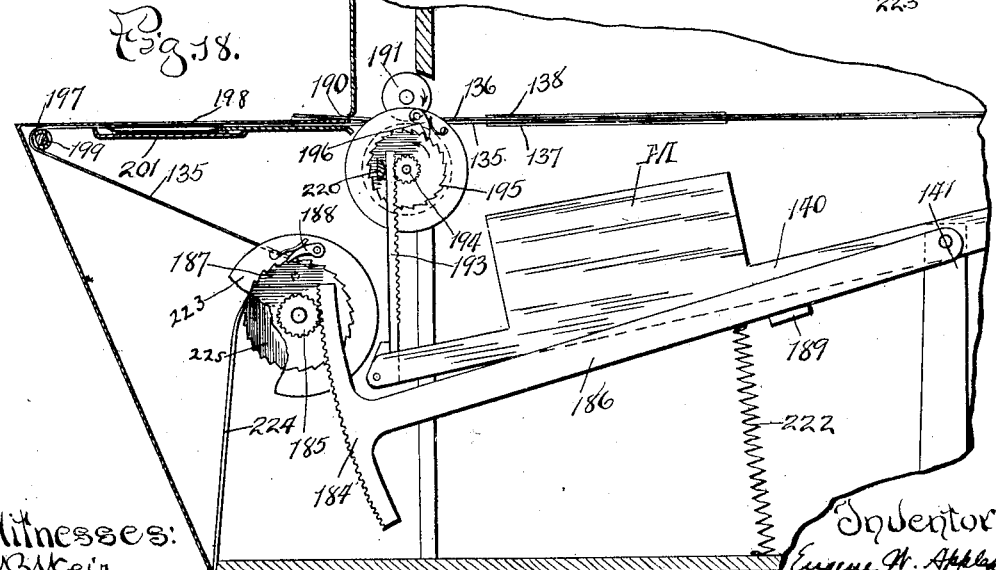
Witnesses:
JB Keir
C Plumtree
Inventor
Eugene W. Applegate,
by A. Miller Belfield
Atty.
THE NORRIS PETERS CO., PHOTO-LITHO., WASHINGTON, D. C.

UNITED STATES PATENT OFFICE.

EUGENE W. APPLEGATE, OF CHICAGO, ILLINOIS, ASSIGNOR, BY MESNE ASSIGNMENTS, TO THE SECURITY CASH REGISTER COMPANY, OF SAME PLACE.

CASH-REGISTER.

SPECIFICATION forming part of Letters Patent No. 670,191, dated March 19, 1901.

Application filed April 17, 1899. Serial No. 713,307. No model.

*To all whom it may concern:*

Be it known that I, EUGENE W. APPLEGATE, a citizen of the United States of America, and a resident of Chicago, county of Cook, and State of Illinois, have invented certain new and useful Improvements in Cash Registers and Recorders, of which the following is a specification.

My invention relates in general to cash-registers adapted for use in indicating and registering the amounts of successive cash transactions, and in particular to cash-registers in which a plurality of independent or individual normally-locked cash-drawers are provided for the separate use of different clerks or officials connected with the business or of different departments or divisions of the same.

Prominent objects of my invention are to prevent the operation of the machine by unauthorized persons; to prevent the different clerks from gaining access to the cash of each other; to arrange for the formation of a permanent record of all of the transactions of the machine in their proper order and to allow the various desired details of each transaction—such as its date, its nature, its amount, and so on—to be included in such record; to allow the name of the purchaser or other matter to be inscribed upon this permanent record, if desired; to prevent each clerk from gaining access to his cash without recording the fact that he has done so upon this permanent record; to allow the easy and instantaneous calculation of the cost of purchases involving computations difficult to make, and to accomplish the above results in a simple, practicable, and expeditious manner.

In the machine which I have shown in the drawings for carrying out my invention the date and nature of each transaction—that is to say, whether it is a charge, cash, or exchange transaction—are arranged for record before the amount of the purchase is indicated and registered. After this has been done the transaction is indicated, registered, and recorded by three operations of the machine. By the first of these the individual cash-drawer of the clerk making the transaction is partially unlocked and the device for identifying this clerk is set for record.

By the second operation the amount of the sale is indicated and registered and set for record. By the third the partially-unlocked drawer is completely unlocked, so that it can automatically open, duplicate records of the transactions, one for the customer and the other for the proprietor are made, and the customer's record is fed out of the machine and the other is stored within it. It will be seen that by this method of procedure the clerk cannot open his cash-drawer without making a record of that fact. The first operation is performed by the proper one of a plurality of individual keys or actuators, which are made separable or detachable from the machine, so that they can be retained in the possession of the different clerks to whom they are allotted and are also made different or dissimilar, so that each one can partially unlock the drawer of the clerk possessing it, but cannot partially unlock any one of the other drawers. By such arrangement it will be seen that each clerk while he can readily gain access to his own cash-drawer cannot open those of the other clerks. As a preferred arrangement, the indicating, registering, recording, and other mechanisms operated in the second and third operations are normally locked and are unlocked upon the use of any one of the clerks' separable and dissimilar keys or actuators. As a result, it will be seen that no one except the clerks or other rightful possessors of the individual keys can either operate the machine or tamper or interfere with it.

The machine shown in the drawings also contains other novel features and constructions, which will be fully pointed out hereinafter.

In the accompanying drawings, Figure 1 is a perspective view of a cash register and recorder embodying my invention. Figs. 2 and 3 are respectively a plan and a front elevation of the same, with portions of its casing removed, so as to expose the interior mechanism to view. Fig. 4 is an end elevation of the machine. Figs. 5, 6, 7, and 8 are vertical sections taken on lines 5 5, 6 6, 7 7, and 8 8, respectively, in Fig. 2, the indicator-wheels being omitted in Fig. 7 and the mechanisms of Fig. 7 being omitted in Fig. 6. Fig.

9 is a plan view of the right-hand forward corner of the machine, with the cover removed, on a slightly larger scale. Fig. 10 is a vertical section on line 10 10 in Fig. 9. Figs. 11, 11ª, 12, 13, and 14 are details of construction. Fig. 12ª is a plan view of an end portion of the machine with certain parts omitted to better illustrate certain other parts. Fig. 15 is a section on line 15 15 in Fig. 14. Fig. 16 is an enlarged elevation showing a portion of the right-hand end of the machine. Fig. 17 is a section taken on line 17 17 in Fig. 16. Fig. 18 is an enlarged elevation of the lower right-hand portion of the machine looking forwardly from the rear thereof. Fig. 19 is an elevation of a small portion of the left-hand end of the machine. Fig. 20 is a section taken on line 20 20 in Fig. 19; and Figs. 21, 22, and 23 are views of details of construction.

The machine which I have shown in the drawings for carrying out my invention comprises a substantially rectangular case E, having a plurality of individual or independent drawers arranged in its lower portion and having the operating mechanism confined within the case above the drawers.

Preliminary to indicating, registering, and recording the transaction the clerk or other user of the machine arranges or prepares for the record its date and its nature—that is to say, whether it is a charged or an exchanged or other transaction. The date of the transaction is prepared for the record by properly adjusting three longitudinally-adjustable slides 1, 2, and 3, which are arranged to slide back and forth in apertures formed in the case E, Figs. 1, 2, 6, and 9, near its right-hand end, and the nature of the transaction is prepared for the record by properly adjusting a fourth slide 4, which is arranged to slide back and forth along the side of the slide 3. The slide 1 bears upon it letters forming the names or abbreviations of the names of the different months of the year. The slides 2 and 3 carry figures which when associated together, if necessary, form the number of the day in the month. The slide 4 bears upon it symbols or characters indicating the nature of different transactions—such as "Ex." for "exchange," "Ch." for "charge," "Bl." for "balance," and so on. In order to set or arrange for record the desired date and nature of transaction, these slides 1, 2, 3, and 4 are adjusted so that the month on slide 1, the figures indicating the day of the month on slides 2 and 3, and the symbols indicating the nature of transactions on slide 4 appear next to or just outside of the case E.

It will be seen that the slide bearing the names of the months and the slides bearing the figures forming the day of the month will require but little adjustment, for the former need be changed but once a month and the latter but once each day.

The rear end of the slides 1, 2, 3, and 4 are supported and guided by a support and guide 9, having apertures which receive long pins 10 10, secured to or formed upon the ends of the slides. This guide and support 9 is secured to a horizontally-arranged bar 11, which in turn has its right-hand end secured to the case E.

The way in which the date and nature of each transaction are prepared for the permanent record upon the adjustment of the slides 1, 2, 3, and 4 is to set in printing position types corresponding to those borne by said slides. In the arrangement shown these types are carried by and arranged upon the peripheries of four independently rotatable type-wheels 5, 6, 7, and 8, Figs. 2, 3, and 9. The type on the periphery of the wheel 5 corresponds to the letters on the slide 1, the type on the wheels 6 and 7 to the figures on the slides 2 and 3, and the types on the wheel 8 to the symbols on the slide 4. When the slides 1, 2, 3, and 4 are properly adjusted to expose the name, figures, and symbols of the desired date and nature of transaction the corresponding types on the type-wheels 5, 6, 7, and 8 are in their lowermost positions, or, in other words, on the bottom of their respective type-wheels.

The type-wheels 5, 6, 7, and 8 can be readily rotated, so as to secure their adjustment, as a result of the adjustment of the slides 1, 2, 3, and 4 by any suitable mechanism, such as intermeshing pinions 12 12 on the wheels and the racks 13 13 on the slides. The racks 13 13 are made with shoulders at their inner ends, so that they can act as stops to limit the inward thrusts of the slides by striking against the support and guide 9, as well shown in Fig. 6. It will thus be seen that the date and nature of each transaction can be set for record without interfering with the operation of the machine in the least and without preventing the indication and registration of any other item or detail in connection therewith.

When the date and nature of the transaction are properly set for record, the clerk or other person using the machine pushes in one of the plurality of independent or individual keys or actuators $a\ b\ c\ d$. The number of these individual keys or actuators $a$, $b$, $c$, and $d$ corresponds to the number of clerks or authorized persons using the machine. Each of these persons is allotted one of the keys or actuators. In pushing in his allotted key or actuator the clerk partially unlocks one of the plurality of independent or individually normally-locked drawers A B C D, which, like the keys or actuators $a$, $b$, $c$, and $d$, are respectively allotted to the different clerks or persons using the machine.

The keys or actuators $a$, $b$, $c$, and $d$ are made detachable or separable from the machine and dissimilar or different from one another, so that each one can be employed to partially unlock one, and one only, of the individual drawers. In this way it will be seen that not only are unauthorized persons prevented from using the machine, but at the same time the different clerks are prevented from opening any of the cash-drawers except their own.

The keys $a$, $b$, $c$, and $d$ could be made separable and dissimilar in any desired way. As a simple arrangement I have shown them made in the form of long push-rods having dissimilar cross-sections, as well shown in Figs. 14 and 15. In such case they are intended to enter sockets $a'$, $b'$, $c'$, and $d'$, Fig. 2, having the cross-sections of their openings corresponding in shape to the dissimilar cross-sections of the keys—that is to say, the key or actuator $a$ can enter the socket $a'$, but cannot enter any of the sockets $b'$ $c'$ $d'$, the key $b$ can enter the socket $b'$, but cannot enter any of the sockets $a'$ $c'$ $d'$, and so on. The sockets $a'$, $b'$, $c'$, and $d'$ are arranged in position at the left of the dating-slides 1, 2, 3, and 4 and have their forward ends supported by and secured to the front of the case E and their rear ends supported by and secured to a horizontally-arranged rod or bar 14. The latter is secured to and supported by the horizontal bar $9^a$, Figs. 2 and 9, and by the transversely-extending frame-piece 15, in which is mounted the shaft 16, carrying the type-wheels 5, 6, 7, and 8.

The way in which the keys or actuators $a$, $b$, $c$, and $d$ partially unlock the corresponding drawers A, B, C, and D when such keys or actuators are made in the form of long push-rods, as shown, is to have an inward thrust of such push-rods after they have been properly introduced into their sockets unlock one of two locking devices which are arranged to normally maintain each drawer in a locked condition. The locking devices shown for actuation by such inward thrusts of the keys or actuators $a$, $b$, $c$, and $d$ comprise catches $d^2$, Figs. 7 and 10, on the rear ends of the inner sides of the drawers and vertically-reciprocating pins $d^3$, Figs. 7 and 10. These pins are adapted to engage the catches $d^2$, and thereby lock the drawers, and to be disengaged therefrom by an upward movement, so as to unlock the same so far as they themselves are concerned. The pins $d^3$ are elevated to disengage them from the catches by thrust-pins $d^4$, which are thrust inwardly by the inward thrust of the keys $a$, $b$, $c$, and $d$, and which when so thrust inwardly pass below wedge-blocks $d^5$, secured to the upper ends of the reciprocating pins $d^3$. The reciprocating pins $d^3$ have their lower ends confined in suitable guides 17, secured to a floor 18, which is arranged above the drawers and separates them from the operating mechanism of the machine. The upper ends of the reciprocating pins work in guides 19, secured to the horizontally-arranged frame-piece 11. The reciprocating pins are held normally in a lowered position, so as to normally engage their respective catches $d^2$ by coil-springs 20, whose upper ends act against the guides 19 and whose lower ends act against the wedge-blocks $d^5$. The thrust-pins $d^4$ are thrust inwardly by the inward thrust of the keys or actuators $a$, $b$, $c$, and $d$ by means of plungers $d^6$, working in the sockets $a'$, $b'$, $c'$, and $d'$ and connections between these plungers and the thrust-pins. The plungers $d^6$ are held normally in a forward or retracted position by coil-springs 22, having their forward ends acting against abutments on the forward ends of the plungers and having their rear ends acting against the horizontal frame-piece 14, which acts as a guide for the plungers, Fig. 10. The operation of the clerks' or individual keys or actuators also arranges or sets for record suitable devices for identifying the persons using the machine. In this way it will be seen that each clerk in partially unlocking his cash-drawer must prepare for the record the fact that he has done so. In the arrangement shown the way in which devices for establishing this identity are set for record is to place types indicating or designating their identity in position to be printed upon the record of the transaction. These types are conveniently carried by a type-wheel 23, Fig. 9, mounted upon the shaft 16, carrying the dating type-wheels 5, 6, and 7. The types upon this wheel consist of the letters A, B, C, and D for respectively designating the clerks using the drawers A, B, C, and D. The type on the clerk-indicating wheel 23, which is to be printed upon the record, is brought into its lowermost position by a suitable rotation of the wheel. The latter is rotated by means of gear-wheels 25 and 26, respectively, on a rock-shaft 24, Figs. 9 and 10, and on the hub of the type-wheel 23 and an intermediate gear 27 on a spindle projecting from the transverse frame-piece 15. The rock-shaft 24 is rocked to an extent necessary to place the proper type on the wheel 23 in its lowermost position by the ends of the plungers $d^6$ acting against pins or projections $d^7$ on the rock-shaft 24. The combined length of the keys $a$, $b$, $c$, and $d$ and the plungers $d^6$ coöperating with them is successively greater. This can be arranged by having either the keys or the plungers of successively-greater lengths. In Fig. 15 the keys are shown so constructed, it being understood that the plungers are of equal length. In either case it will be seen that the type-wheel 23 will be turned successively greater amounts by the inward thrust of the different keys or actuators. The rock-shaft 24 is retained in any position to which it may be turned by a ratchet mechanism comprising a ratchet-wheel 29 on its end and a spring-controlled pawl 30, pivotally supported by an arm 31, which extends upwardly and forwardly from the horizontal bar $9^a$, Fig. 10. After the clerk has operated his allotted individual key or actuator, and thereby partially unlocked his drawer and set his identity for record, he indicates the amount of the purchase or transaction to be registered. The amount of the purchase is thus indicated upon a graduated scale G, made in the form of a long strip or plate secured to an upper inclined portion $e$ of the case E, Figs. 1 and 22. The opposite sides of this scale are graduated so as to indicate any desired unit of value. In the one I have shown the lower edge represents dollars and the upper edge cents. Each edge is graduated from "1" to "100," so that any amount between one cent and ninety-nine dollars and ninety-nine cents can be indicated. The indications can be made upon this graduated scale by a couple of fingers or pointers 32 and 33, the former for the dollar edge and the latter for the cent edge of the scale. The fingers or pointers 32 and 33 are moved from left to right until they reach the proper figures to indicate the amount of the purchase. In indicating the amount of purchase the clerk also automatically registers the same. The means I have shown for thus automatically registering the amount of a purchase comprises a couple of sets of numbered and connected wheels 34 and 35, such as are commonly employed in cyclometers, Figs. 2, 8, and 20. The lower set 34 indicate dollars and the upper set 35 indicate cents. These two sets of registering-wheels are conveniently secured in position at the left-hand end of the machine by suitable brackets 36 and 37, secured to the left-hand frame-upright $h$.

The registering mechanism could be connected with the indicating-pointers 32 and 33, so as to automatically register the indicated purchase by any suitable mechanism. As a preferred arrangement, however, and also as a matter of further and specific improvement, this connection is made by the devices shown in the drawings. These devices consist of a couple of long screws 38 and 39, arranged longitudinally in the machine below the inclined portion $e$ of the case E on opposite sides of the scale G, as well shown in Fig. 7. These screws 38 and 39 are conveniently mounted in the frame-uprights $h$ and $h'$ of the frame H. They are connected with the pointers 32 and 33 by internally-threaded collars 40 and 41, having projections 42 and 43, which extend upwardly through slots 50 and 51 in the slanting portion $e$ of the case and have the pointers 32 and 33 secured to them. In this way a rotation of the screws will produce a corresponding movement of the pointers. The projections 42 and 43 work in longitudinal slots or guides 50 and 51, conveniently formed by arranging strips 46 46 and 47 47 across the machine and securing the ends thereof to the opposite frame-uprights $h$ and $h'$ of the machine-frame. The rotation of the longitudinally-arranged screws 38 and 39 is communicated to the registering-wheels 34 and 35 by means of gears 48 and 49, respectively, on the dollar-screw 38 and the right-hand registering-wheel 34 and an intermediate gear 52 on a spindle supported by the bracket 36 in the case of the dollar-registering mechanism, and by means of gears 53 and 54, respectively, on the cent-registering screw 39 and on the right-hand cent-registering wheel 35 and an intermediate gear 55 on a spindle supported by the bracket 37 in the case of the cent-registering mechanism.

In order to prevent the reverse movement of the rotary screws 38 and 39 from turning the registering-wheels 34 and 35 backward, and thereby destroying the registration, the gear-wheels 48 and 53 are loose on the rotary screws 38 and 39, respectively, and are turned when said screws are rotated in a direction to advance the pointers 32 and 33 by the engagement of pawls 90 90, carried by projections 91 91 on the screws, with ratchet-wheels 92 92, secured to the gears 48 and 53. When the rotary screws 38 and 39 are turned in the reverse direction, so as to return the pointers 32 and 33 to zero or initial position, the pawls 90 90 will travel around the ratchet-wheels 92 92 without turning them, and therefore without turning the gears 48 and 53. As a result the registering-wheels 34 and 35 will remain stationary when the rotary screws 38 and 39 are turned in a reverse direction.

The gear-wheels 52 and 55 are desirably subjected to a friction device, such as springs 94 94, secured to the frame-upright $h$, which prevent the gears 52 and 55, and therefore the registering-wheels 34 and 55, from turning during the reverse movement of the screws 38 and 39. The registering-wheels 34 and 35 can be seen through slots 98 and 99 in the slanting portion $e$ of the case E.

As a matter of further improvement the amount of the purchase indicated is also displayed through apertures 56 and 57, formed in the top of the case E. The dollars are shown through the aperture 56 and the cents through the aperture 57. These indications are made by means of a couple of rotary disks 58 and 59, having consecutive numbers from one to one hundred near their peripheries and supported upon spindles secured to the rear wall of the machine, so that when rotated the numbers near their peripheries will appear through the apertures 56 and 57. These indicating-disks 58 and 59 are connected with the indicating-pointers 32 and 33, so that any movement on the part of the latter will rotate the disks an extent sufficient to bring the corresponding figures in the rear of the apertures 56 and 57. The connections shown between the disks and the pointers or fingers consist of a couple of strings 60 and 61. The string 60 has one of its ends attached to the collar 40 on the screw 38 and its other end coiled about a reel on the disk 58, Fig. 2. Its intermediate portion is led about a couple of wheels or pulleys 62 and 63, mounted on spindles supported by the left-hand frame-upright $h$. The string 61 has one of its ends attached to the collar 41 on the screw 39 and its other end coiled about the reel on the disk 59. Its intermediate portion is similarly led about pulleys 66 and 67 on the frame-upright $h$. The disks 58 and 59 are automatically returned to zero or initial position by springs 95 95, secured to the spindles supporting them.

The screws 38 and 39 can be turned or rotated so as to advance the pointers 32 and 33 along the scale G by turning a couple of milled wheels 68 and 69, Figs. 1 and 3. The milled thumb-wheel 68 is gear-connected with the screw 38 by gears 70 and 71, respectively, on its spindle and on the screw 38 through the intermediate gear 84. The thumb-wheel 69 is gear-connected with the screw 39 by gears 72 and 73, respectively, on its spindle and on the screw 39 and an intermediate or idle gear 74 on a spindle supported by the right-hand frame-upright $h'$ and by a bracket 75, secured to the latter. The spindles of the milled wheels 68 and 69 are mounted in the right-hand frame-upright $h'$ and the adjacent end of the case E.

The rotary screws 38 and 39 are normally subjected to means tending to normally and automatically return the pointers 32 and 33 to their zero positions. As a simple arrangement I have shown coil-springs 80 and 81 for this purpose. The coil-spring 80 is coiled about a spindle 82, mounted in the right-hand frame-upright $h'$ and the adjoining bracket 75. One end of this spring is connected to a screw 83, secured to the upright $h'$, and its other end is secured to the spindle 82, so as to tend to turn the same. This tendency to turn the spindle 82 is communicated to the rotary screw 38 by a gear 84, carried by the spindle and meshing with the gear 70 on said screw. The spring 81 is similarly connected to a fixed screw 85 and coiled about and secured to the spindle 86, carrying the gear-wheel 74. In this way it tends to rotate said gear-wheel 74, and thereby rotate the rotary screw 39 through the medium of gear 73, with which the gear 74 meshes.

The rotary screws 38 and 39 are automatically held in their adjustments against the tendency to return to their initial or zero positions. The devices shown for this purpose consist of a couple of ratchets 87 and 88, respectively, on the screws 38 and 39 and a couple of coöperating spring-controlled pawls 103 and 104, which are pivotally supported by the frame-upright $h'$. The indication of the amount of the purchase also automatically sets in position to be printed upon the record types designating such amount of purchase. This is done by turning a couple of pairs of type-wheels 96 96 and 97 97 on the shaft 16, so as to place in their lowermost positions figures on their peripheries designating the amount indicated by the indicating mechanism. Each of these type-wheels has its periphery provided with consecutive numerals from "0" to "9." The type-wheels 96 96 are to represent tens and units of dollars, respectively, and the wheels 97 97 are to represent tens and units of cents, respectively. The wheels 96 96 are so connected that a complete rotation of the right-hand one will rotate the left-hand one a space equal to the distance between the consecutive figures. The wheels 97 97 are similarly connected.

The dollar-wheels 96 96 are turned when the rotary screw 38 is turned by a couple of gear-wheels 99 and 100, respectively, on the screw 38 and on the right-hand gear 96. The cent type-wheels 97 97 are turned upon the rotation of the rotary screw 39 by means of gear-wheels 101 and 102, respectively, on said screw 39 and on the right-hand type-wheel 97.

It will be seen from the foregoing that by turning the thumb-wheels 68 and 69 the amount of the purchase is indicated upon the scale G and also through the apertures 56 and 57 in the upper part of the machine, while at the same time this amount is also registered and added to the total amount received and is prepared or arranged to be printed upon the record of the transaction.

As a matter of further improvement the indicating mechanism and therefore the registering mechanism are normally locked; but they are automatically unlocked when the clerk arranges or sets his identifying device for the record. In this way the machine cannot be operated so as to merely indicate the amount of a purchase without doing more. The identity of the clerk must be left upon the record in order that he may indicate the purchase. As a simple arrangement for so doing the right-hand one of the cent type-wheels 97 97 is held against rotation by a finger 106, Figs. 9 and 11$^a$, which is subjected to a spring 107, tending to normally force it downward, so as to cause its engagement with the gear 102 on said wheel. This finger 106 is elevated, so as to withdraw it from engagement with the gear 102 by the rocking of a rock-shaft 108, supported by one of the guide-strips 46 and having the finger 106 extended or projecting from its right-hand end. The rock-shaft 108 is thus rocked by the elevation of a pin or arm 109, which extends rearwardly from its left-hand end. The pin or arm 109 is thus elevated by a shoulder 110 on the clerk's type-wheel 23, which shoulder is arranged to engage a bent portion of the end of the arm 109 when the type-wheel is turned by the inward thrust of any one of the keys or actuators $a$, $b$, $c$, and $d$.

The indicating mechanism is automatically released, so as to permit the indicators to return to normal position upon the arrangement for record of any one of the clerk's identifying devices. This can be done by actuating the pawls 103 and 104, which normally engage the ratchet-wheels 87 and 88, Fig. 16, so as to cause them to release said ratchet-wheels, and thereby allow the screws 38 and 39 to rotate in a reverse direction upon the inward thrust of any one of the clerk's keys or actuators $a$, $b$, $c$, and $d$. The pawls 103 and 104 are thus actuated by a slide 112, Figs. 2, 5, 16, and 17, which is arranged to slide back and forth along the upper edge side of the frame-piece $h'$ and which engages the upper ends of the pawls, so that when slid forwardly it throws the lower ends of the same out of engagement with the ratchet-wheels 87 and 88. The slide 112 is guided by a couple of pins 113 and 114, which work in slots formed in said frame-upright $h'$. It is slid forwardly by a vertically-extending rocker-arm 115 on a horizontally-arranged rock-shaft 116, supported by the frame-upright $h'$ and an arm projecting from the arm 31. The rock-shaft 116 is rocked so as to swing the rocker-arm 115 forwardly upon the insertion of any one of the keys or actuators $a$, $b$, $c$, and $d$ by the inclined surfaces 118, Fig. 10, formed at the rear ends of the boxes or cages $d^8$, which contain the pins $d^7$ on the rock-shaft 24 and serve as media of connection between the plungers $d^6$ and the thrust-pins $d^4$, Fig. 10. By such arrangement it will be seen that when any clerk operates his individual key or actuator the indicating mechanism will be automatically returned to zero or normal position, so that he may indicate the amount of the transaction which he wishes to register and record.

It will be seen that for all transactions in which the amount of purchase is stated or given or can be readily computed it can be readily indicated upon the scale G by merely moving the indicating-pointers 32 and 33 so that they will indicate that amount; but in case the amount of the purchase is the cost of a fractional number of units of the commodity at either a fractional or a simple number of cents or dollars per unit it is obvious that the amounts to be registered must be computed and that this computation will be more or less difficult. For instance, if the purchaser desires to buy sixteen and one-third pounds of some commodity whose price is four and one-half cents per pound the clerk will have to compute or calculate the amount which he must charge the purchaser and must register and record upon the machine. As a matter of further improvement I provide means whereby purchases involving calculations of this nature can be automatically computed and can be indicated while being so computed. The means shown comprises a table J, Fig. 23, having a series of columns which are respectively headed by the figures designating the prices of a unit commodity— that is to say, the figures at the heads of the columns $j$ $j$ designate the prices which may be asked for one pound, one yard, &c.—such as "$4\frac{1}{2}$," "5," "$5\frac{1}{2}$," and so on. These prices are arbitrarily assumed as those most likely to arise in a general merchandise business. The figures in each column are the factors required to produce successive unit values when multiplied by the figure at the head of that column—that is to say, in the column headed by "$4\frac{1}{2}$" the figures are at the top of that column "22," "$21.12\frac{1}{4}$," "$21.08\frac{3}{4}$," and so on, which respectively produce "99," "98," "97," and so on, when multiplied by "$4\frac{1}{2}$."

The table J is mounted so that any one of the figures at the heads of the columns can appear through an aperture 129 in the upper portion of the case E and also so that the corresponding column can appear through a longitudinal slot 130 in said portion of the case E. A simple way of thus mounting the table J is to wrap it about a roller K, Figs. 4 and 8, which is conveniently supported by the uprights $h$ and $h'$ of the frame H. This roller can be turned so as to bring the desired one of the columns with its heading-figure into view by turning a hand-wheel or roller 131, secured to one of the ends of its spindle. The roller K is held in any one of its adjusted positions by a friction-catch 227, engaging a toothed wheel 228 on the roller. The upper indicating-pointer 33 is provided with a rearwardly and upwardly extending finger or pointer 132, which extends backward to the slot 130. When it is desired to compute and indicate the cost of any desired number of units of a commodity at a given price per unit, the roller K is so turned as to bring the figure designating that price per unit in position behind the aperture 129, and then the pointer 132 is moved until it reaches the number in the exposed column $j$ designating the desired number of units of the commodity. In such case the pointer 33 will indicate upon the scale G the price of the purchase, for it is obvious that the successive units on the scale G are the products of the figure heading the column into the successive figures in that column. In this way it will be seen that the amount of a transaction involving the most complicated calculations is automatically indicated and registered in as little time as would be required to indicate the simplest given amount and that therefore the most ignorant clerk can operate the machine to register and record the most complicated transaction without the slightest danger of error and without any delay. It will readily be seen also that this mechanism can be employed to ascertain the amount or quantity of the commodity which can be purchased for a given price. This is done by turning the roller K, as before, and then moving the indicating-finger 33 along the scale G until it reaches the given amount upon the latter. The figure indicated by the indicating-finger 132 will then be the one designating the number of units of the commodity. After the amount of the transaction has been indicated, registered, and set for record it is automatically recorded and the drawer previously partially unlocked is completely unlocked, so as to permit it to open. In the machine I have shown the record is thus printed upon a couple of strips of paper 135 and 136 by means of a couple of inked or transferring ribbons 137 and 138, Fig. 18, which, with the paper strips, are arranged below the type-wheels 5 6 7 8 23 96 96 and 97 97, which have been set or turned so as to bring the proper types in their lowermost positions, as heretofore described. The record is printed upon these paper strips 135 and 136 by a vertically-movable platen M, which is arranged to rise and strike or press the ribbons and paper strips against the type-wheels. The printing-platen M is thus elevated by a swinging lever 140, which is arranged longitudinally in the machine and carries said platen on its right-hand end. The swinging lever 140 is pivotally supported by posts 141, rising from the floor 18 of the machine, Fig. 10. The swinging lever 140 is subjected to springs 142, secured to or near its left-hand end, Fig. 3, tending to normally swing its left-hand end downward, and thereby elevate its right-hand end and cause the platen to strike the type-wheels. It is normally prevented from so doing, however, by a swinging lever or support 143, which is arranged to swing back and forth under its left-hand end. This swinging lever or support 143 is pivotally supported upon posts 144, secured to the floor 18. The swinging lever or support 143 is swung upwardly, so as to release or trip the platen-lever 140 by a tripping-lever 145, having a bent end which engages a pin or projection 146 on the swinging support 143. The tripping-lever 145 is pivotally supported by a post 147 on the floor 18. It is swung so as to withdraw, with the swinging support 143, from below the platen-lever 140 by the depression of the vertically-reciprocating plunger L, which is arranged at the left-hand side of the machine.

In view of the fact that but a slight movement of the tripping-lever 145 is necessary to release the platen-lever 140 and the further fact that it must be in its normal position in order to support the platen-lever when the latter is restored to its normal position this lever 145 is depressed by the plunger L during only the first part of the downward stroke thereof and is automatically released after such slight depression. As a simple arrangement for thus depressing this lever during only the initial portion of the descent of the plunger and for then releasing the same and also for allowing the plunger to rise after the lever has been restored to its normal position without interfering with it the left-hand end of said lever 145 is provided with a projection or pin 148, Fig. 11, and the plunger L is provided with a swinging catch 149, which is held in position by its supporting-bracket 150, so as to cause it to engage the pin 148 upon the downward stroke of the plunger and to swing downwardly upon coming into contact with said pin 148 upon the rise of the plunger. Obviously the pin 148 will slide outwardly and away from engagement with the catch 149 after the plunger has descended a short distance or only a portion of its descent. The catch 149 is held normally in position to engage the pin 148 by a small spring 151.

The reciprocating plunger is conveniently supported in position and guided by brackets or guides 153 and 154, secured to the left-hand frame-upright $h$, Fig. 3. It is automatically raised to its normal elevated position by a spring 170, secured to its lower end and suspended from the upper bracket 154.

The tripping-lever 145 is automatically returned to its normal position by a leaf-spring 155, Fig. 3, secured to the post 147 and acting upon the lower edge of the left-hand portion of said lever.

After the swinging support 143 has been swung so as to trip or release the platen-lever 140 and has been automatically returned to its normal position by the disengagement of the tripping-lever 145 from the plunger L the platen 140 is automatically swung, so as to restore it to its normal position with the platen in a lowered condition by the latter part of the downstroke of the plunger. This is done by a swinging platen-restoring lever 180, Fig. 2, pivotally supported by the post 147 and having its left-hand end in position to be engaged by the projection 164 on the plunger L and having its right-hand end provided with a pin or projection 181, which is adapted to engage the left-hand end of the platen-lever 140.

It will be seen that by the arrangement above set forth the printing-platen lever 140 is tripped or released by the initial depression of the plunger L and is afterward restored to its normal position with the platen lowered by the subsequent downward movement of the plunger. As a desired arrangement the plunger L in addition to printing the record completely unlocks the individual drawer which was partially unlocked by the operation of one of the individual or clerks' keys or actuators. The mechanism shown for this purpose comprises a swinging lever 157 and a vertically-reciprocating locking-bar 158, pivotally connected with the right-hand end of the lever 157 by means of a link 159 and constructed with locking pins or projections 160, which are adapted to enter depressions in the inner sides of the individual drawers A, B, C, and D, as well shown in Figs. 3 and 7. The lever 157 is pivotally supported upon an arm 162, extending outwardly from the post 147. Its left-hand end is depressed, so as to elevate its right-hand end and thereby elevate the locking-bar 158 by a projection 164 on the plunger L. It is held normally in position with its right-hand end, lowered by a spring 165, secured to the floor 18 and engaging its right-hand end. When any one of the individual drawers A, B, C, and D is thus completely unlocked, it is automatically opened by one of the springs 171, which are respectively secured to the rear walls of the drawers and act against the rear wall of the case E.

The paper strips 135 and 136, upon which the record of the transaction is printed, is conveniently held upon a reel 172, Figs. 3 and 8, which is confined at the left-hand side of the machine. The paper strips 135 and 136 are supported above the printing and drawer-opening mechanism by a support 176, arising from the floor 18, Fig. 3. The record-strips 135 and 136 are automatically fed or advanced after the printing of the record. This is done by means of feed-wheels 191 and 192, Figs. 3 and 18, arranged to engage these record-strips to the right of the portion upon which the record has been printed. The upper feed-wheel 191 is turned by the rotation of the lower one 192. This lower one 192 is automatically turned by the depression of a rack 193, which engages a gear-wheel 194 on the feed-wheel 192. The rack 193 is lowered by the depression of the printing-platen lever 140, to which it is pivotally connected. The rack 193 is guided by a guide 220, secured to the machine-frame. The backward movement of the record-strips upon the elevation of the platen-lever 140 is prevented by mounting the gear-wheel 194 loose upon its spindle and providing it with a ratchet-wheel 195, adapted to engage a pawl 196 on the lower feed-wheel 192, so that when the rack 193 is elevated the wheel 194 turns without turning the feed-wheel 192. The upper record-strip 136 is when so fed forward ejected from the machine by way of an opening 190 in the case E. If desired, it can be torn or cut off and given to the purchaser. As a matter of further improvement, however, the case E is so formed as to provide a platform or table 197 below the strip after it has emerged from the opening 190. In such case the clerk can write any matter, such as the purchaser's name, upon the ejected portion of the strip before tearing it off. In this way the printed record can serve as a receipt to each individual customer. The lower paper strip 135 is coiled around a storage-reel 178, Figs. 3 and 18, in which way a permanent record of all the transactions registered on the machine is retained within the machine for the use and inspection of the proprietor. This storage-reel 178 is supported by a spindle secured to the frame H. The storage-reel 178 is automatically turned so as to wind the paper strip 135 upon it after the recording of each transaction. This is conveniently done by the depression of a vertically-reciprocating toothed-arc 184, which meshes with a pinion 185, Figs. 18 and 21, carried by the reel-spindle. The reciprocating toothed arc 184 is carried by a swinging arm 186, which is arranged alongside of the platen-lever 140 and is pivotally supported by the posts 141, supporting said platen-lever. The swinging arm 186 is elevated when the platen-lever 140 rises by a lug or finger 189, which is secured to the platen-lever and extends under the arm 186. The arm 186 is lowered when the platen-lever descends by a spring 222, secured to said arm 186 and to the floor 18. It will be seen that by this arrangement the reel 178 is rotated so as to wind the record strip 135 upon it at a time when the printing-platen M is descending, and therefore at a time after the record has been printed. It will be further seen that the extent of rotation on the part of the reel 178 will be varied in accordance with the requirements—that is to say, it will be rotated successively smaller portions of a complete revolution as the amount of record-strip upon it increases by reason of the fact that the arm 186 is not drawn downward by the platen-lever 140, but by the spring 222, which will take up only the slack portion fed by the feed-wheels 191 and 192.

In order to prevent the unwinding of the record-strip 135 upon the elevation of the swinging arm 186, the pinion 185 is made loose upon the reel-spindle and is provided with a ratchet 187, which engages and drives a spring-controlled pawl 188, secured to a flange 223, which is rigid with the reel 178. By this arrangement the ratchet 187 drives the reel during the descent of the arm 186, but turns without rotating it during the elevation of said arm. The reel 178 is held stationary during the rise of the arm 186 by a spring-catch 224, which rises from the bottom of the case E and engages the teeth of a second ratchet-wheel 225, secured to the reel 178.

As a matter of still further improvement the record-strip 135, which is to be stored and so form a permanent and inaccessible record of all transactions of the machine, is arranged below a platform or table 197 before being coiled upon the storage-reel 178, and a slot 198 is made in this platform or table 197. In this way any desired matter can be written upon the retained record-strip 135, as well as upon the strip given to the customer. The strip 135 is convenienty supported in position below the table 197 by a roller 199, mounted in the right-hand end of the case E. As a preferred arrangement a transmitting-strip, such as an inked ribbon 200, is arranged in position below the slot 198 and above the retained record-strip 135. In this way any matter written upon the ejected portion of the customer's record-strip 136 will be automatically transcribed upon the permanent-record strip 135, and an exact copy of such matter will therefore be made a part of the permanent record. This will allow the proprietor to ascertain the purchaser of each purchase should the clerks write the names of such purchasers upon the customer's strip 136.

In order to prevent the permanent-record strip 135 from being depressed when it is written upon, a table 201 is arranged and supported below the slot 198, Figs. 3 and 18.

The inking-ribbon 200 is conveniently carried by rollers 203 and 204, which are supported at opposite sides of the slide 198 by the end portion of the case E, and by a depending strip 205, secured to the platform 197. These rollers 203 and 204 can be turned by means of thumb-wheels 206 and 207 on the outer ends of their spindles.

The inking-ribbons 137 and 138, by which the record is printed upon the strips 135 and 136, are coiled upon rollers 210 and 211, Fig. 6. They are supported on opposite sides of the type-wheels by supporting-pins 212 and 213, projecting inwardly from the right-hand frame-upright $h'$. The reel 210 is automatically turned after the printing of the record of each transaction, so as to draw a new portion of the ribbons in position for the printing of the record of the next transaction. As a simple arrangement the reel is provided with a ratchet 230, Figs. 3 and 7, which is engaged and driven so as to turn the wheel by the depression of a spring-controlled pawl 231, carried by a swinging lever 232, which is loosely mounted on the reel-spindle. The rear end of this swinging lever 232 is depressed when the platen-lever 140 is lowered by a lug 233, carried by said platen-lever and arranged to act upon the upper edge of the end of the lever 232. The lever 232 is automatically swung so as to raise its rear end when the platen-lever 140 is elevated by the spring 234, secured to the forward end of the lever 232, and also secured to the post 235, supporting the left-hand end of the reel-spindle. The reel is held against backward movement by a pawl 236, supported by the post 235 and engaging a second ratchet-wheel 237 on the reel. It will be seen by this construction and arrangement that the movement of the inking-ribbon occurs when the printing-platen is being reset, and therefore at a time after the record has been printed.

In addition to printing upon the record the identifying-mark of the clerk and the date and characteristics or details of the various transactions I desirably print upon it also the number of each transaction indicated and registered by the machine. As an arrangement for so doing three type-wheels 238, 239, and 240 are mounted upon the shaft 16, carrying the type-wheels, heretofore mentioned, at the right of the clerks' type-wheel 23. Each of these wheels bears types designating numerals from "0" to "9," inclusive. The numerals on wheel 238 are to designate hundreds, on the wheel 239 tens, and on the wheel 240 units. These wheels are connected together as cyclometer-wheels are, so that a complete rotation of the units-wheel will turn the tens-wheel one space and also so that a complete rotation of the tens-wheel will turn the hundreds-wheel one space. The figures to be printed are turned to their lowermost positions, as in the case of the type-wheels previously mentioned. The units-wheel 240 is turned one space by a spring-controlled pawl 241, Fig. 12, which engages a ratchet-wheel 242 on said wheel 240 and is pivotally connected with a swinging arm 243, loosely mounted on the shaft 16. The swinging arm 243 is depressed by a rocker-arm 245, Fig. 6, which is carried by a rock-shaft 246 and has its forward end connected with the rear end of the swinging arm 243 by means of a link 247. The rock-shaft 246 extends across the rear of the machine and has its ends mounted in the frame-uprights $h$ and $h'$. It is rocked so as to depress its arm 245 by a swinging lever 248, Figs. 2 and 6, which is pivotally supported by a post 249 and has its rear end connected with the forward end of a rocker-arm 250 on the rock-shaft 246 by a link 251. The forward end of the swinging lever 248 is elevated, so as to depress its rear end, by a catch or hook 252 on the lever 157. The lever 157 is swung so as to elevate its rear end by the depression of the plunger L, as heretofore set forth. The swinging lever 248 is automatically returned to its normal position by a spring 254, Fig. 3, extending between it and the floor 18. The units type-wheel 240 is prevented from rotating backwardly upon the upward swing of the arm 243 by a spring-catch 258, Fig. 12, secured to one of the strips 46 and arranged to engage the teeth of the ratchet-wheel 242.

The clerks' identifying mechanism is automatically restored to its former condition after the printing of the record. As a convenient arrangement the pawl 30, engaging the ratchet-wheel 29 on the shaft 24, is struck by the depression of a rocker-arm 260, Figs. 2 and 7, on the rock-shaft 246, when the latter is rocked, so as to depress the rocker-arm 250 by the depression of the plunger L, as explained in connection with the mechanism for indicating upon the record the number of each sale or transaction.

The printing of the record and the performance of the attending operations is desirably normally prevented, in which way tampering and meddling and operating of the machine is effectively prevented. A simple arrangement is to normally lock the reciprocating plunger L and to arrange its locking device so that it will be unlocked upon the setting of any one of the clerks' identifying devices. In the arrangement shown the plunger L is normally locked by a swinging locking-bar 263, Figs. 3 and 10, which is pivotally supported upon the floor 18 and has an upturned portion 264, which is arranged to engage a pin or projection 265 on the plunger L. This swinging locking-bar 263 is held normally in an inner position to cause the engagement of the pin 265 by its upturned end 264 by a spring 266, Fig. 10, which extends between the forward post 141 and the upturned right-hand end 267 of the bar 263. This locking-bar is swung forwardly so as to unlock the plunger L by a horizontally-reciprocating pin 268, which is arranged to slide through apertures in the posts 141 141 and act against the elevated horizontal end portion 269 of the bar 263. This reciprocating thrust-pin 268 is slid forwardly by a cam 270 on the rock-shaft 24 striking against the upturned rear end 271 of the reciprocating pin. The rock-shaft 24 is turned so as to cause the cam 270 to strike against the upturned portion 271 of the reciprocating thrust-pin by an inward thrust of any one of the clerks' keys or actuators $a$, $b$, $c$, and $d$, as previously explained. It will be seen that the thrust-pin 268 is held in position to retain the plunger L in an unlocked condition as long as the rock-shaft 24 is held in a locked condition, but that when upon the depression of the plunger L the pawl 30 is tripped, so as to release the ratchet-wheel 29 and allow the rock-shaft 24 to return to its normal position, the thrust-pin 268 will be retracted and will allow the locking-bar 263 to swing rearwardly and again lock the plunger.

The operation of the machine is as follows: The clerk making the sale takes his own key $a$, $b$, $c$, or $d$ and inserts it within the corresponding socket $a'$, $b'$, $c'$, or $d'$. In so doing he unlocks the indicators 32 and 33, so that they automatically return to zero positions; and he partially unlocks his own drawer and sets his own printing-type in position for printing. He next moves the indicators 32 and 33 along the scale $g$ to the positions necessary to indicate the amount of the sale. In so doing he automatically sets the indicators appearing through the apertures 56 and 57 in corresponding position, and also registers the amount of the indication upon the register-wheels 34 and 35 and sets in printing position types to indicate the corresponding amount. He finally depresses the plunger L, whereupon the record from the various type-wheels is printed and the record-strips are automatically fed out of the machine through the aperture 190 and his drawer is completely unlocked, so that it automatically opens.

It will be seen that my invention allows the automatic indication, registration, and recording of all essential and desired details or particulars of each sale or transaction of the business in which it is used, that it effectively prevents every one except the clerks from gaining access to the cash and also prevents each clerk from gaining access to cash of the other clerks, that it cannot be tampered with or operated in the slightest degree by unauthorized persons, and that its mechanism is simple, practical, and inexpensive.

What I claim as my invention is—

1. In a cash-register, the combination with a plurality of keys consisting of relatively long push-rods having dissimilar cross-sections; sockets for said rods having corresponding cross-sections; plungers in said sockets arranged for inward movement within the sockets by the introduction of said push-rods; springs associated with the plunger for restoring the same to their normal positions upon the withdrawal of the keys; and cash-register mechanisms operated by the plungers.

2. The combination of a type-wheel having its periphery provided with types, of the rock-shaft connected with said type-wheel and provided with a plurality of laterally-extending pins; a corresponding number of reciprocating plungers having their ends arranged to act upon said pins; means for holding said plungers normally in a retracted position; separable push-rods having dissimilar cross-sections and arranged to operate the different plungers, the combined length of the cooperating push-rods and plungers being successively greater; and sockets having openings corresponding to the cross-sections of the different push-rods.

3. The combination with a plurality of individual cash-drawers, of a corresponding number of vertically-reciprocating pins adapted to engage catches on the drawers and provided with inclined surfaces; means for holding said pins normally in a lowered position; horizontally-reciprocating thrust-pins arranged to slide below said inclined surfaces, and thereby elevate the locking-pins; a type-wheel having its periphery provided with identifying-types; a rock-shaft connected with said type-wheel and provided with laterally-extending pins or arms; reciprocating plungers connecting with said thrust-pins, and arranged to act upon said laterally-extending arms on the rock-shaft; means for holding said plungers in a retracted position; keys for actuating said plungers, the combined length of the cooperating sets of plungers and keys being successively greater; and means for holding the rock-shaft in any one of the positions to which it may be turned by said plungers.

4. The combination with a rotary screw and with an indicator connected with the screw and movable longitudinally thereof, and also with registering mechanism and type-wheels for printing the indications, of power-transmitting connection between the screw and the registering mechanism and the type-wheels, said connection being adapted to operate the registering mechanism so as to total all of the registrations, and to operate the type-wheels so as to set them for each individual operation.

5. The combination of a type-wheel carrying types adapted to designate the different users of the machine, and having a peripheral shoulder; a rock-shaft having an arm adapted to engage said shoulder; type-wheels bearing types adapted to print the indications; and a finger secured to said rock-shaft and adapted to engage any one of the teeth of the wheel on the last-mentioned type-wheels.

6. The combination with a plurality of individual keys, an indicator and also with a rotary screw for the indicator, of means for automatically turning the screw so as to restore the indicator to zero or initial position; means for holding the screw against such tendency to turn it; means for actuating said holding means so as to release the screw; and mechanism for thus actuating said holding means upon the operation of any one of the individual keys.

7. The combination with a plurality of individual keys, of a corresponding number of reciprocating plungers each actuated by one of said keys, and each provided with an inclined surface; a rock-shaft having a portion of its length arranged to be actuated by any one of said inclined surfaces on said plungers; indicating and registering mechanisms combined with means for automatically restoring the indicators to their zero positions, and also with ratchet devices for holding the same against such tendency; a slide arranged to actuate said ratchet devices so as to release the indicated mechanism; and a rocker-arm on said rock-shaft, for thus actuating said slide.

8. The combination with a plurality of individual cash-drawers, of a reciprocating locking-bar having locking-pins adapted to engage notches or recesses in said drawers; a link connected with said locking-bar; a swinging lever pivotally connected with said link; and a plunger adapted to actuate said swinging lever.

9. The combination with a plurality of individual cash-drawers and with identifying devices for the users thereof, of mechanisms for simultaneously setting for record the identifying device of one of said users and for partially unlocking one of said drawers; and mechanisms for simultaneously forming a record from said identifying device, and for completely unlocking said drawer.

10. The combination with a plurality of individual cash-drawers and with identifying devices for the users thereof, of mechanisms for simultaneously setting for record the identifying device of one of said users and for partially unlocking the corresponding drawer; mechanisms for indicating, registering and setting for record the amount of the transaction; and mechanisms for simultaneously forming the record and completely unlocking said drawer.

11. The combination with a plurality of individual cash-drawers and with identifying devices for the users thereof, of mechanisms for simultaneously setting for record the identifying device of one of said users, and for partially unlocking the drawer thereof; mechanisms for indicating, registering and setting for record the amount of the transaction; mechanisms for simultaneously forming the record and completely unlocking the drawer; devices for normally locking the mechanisms for indicating, registering and setting for record the amount of the transaction, and the mechanisms for forming the record and completely unlocking the drawer; and mechanism for actuating said locking devices so as to unlock said mechanisms, upon the setting for record of the identifying device.

12. The combination with a lever carrying the printing-platen, of spring means tending to actuate said lever so as to cause the platen to print; a swinging support normally holding said lever against said tendency; a tripping-lever arranged to operate said swinging support so as to cause the latter to release the platen-lever; a reciprocating plunger carrying a device adapted to actuate the tripping-lever for the initial portion of its forward stroke, and to pass the same without actuating it upon its return stroke; and mechanism for restoring the platen-lever by the latter part of the forward stroke of the plunger.

13. The combination with a swinging lever carrying the printing-platen, of means for actuating said lever so as to cause the platen to print; a reciprocating plunger adapted to actuate said means upon the initial portion of its forward stroke; and a swinging lever having one of its ends adapted to engage and restore the platen-lever, and its other end adapted to be engaged by the reciprocating plunger upon the latter part of the forward stroke thereof.

14. The combination with a swinging lever carrying a printing-platen, of spring means tending to actuate said platen-lever so as to cause the platen to print; a swinging support arranged to engage the platen-lever so as to hold it against such tendency; a tripping-lever adapted to actuate the swinging support so as to cause the same to release the platen-lever; a reciprocating plunger carrying a swinging catch adapted to engage a pin on the tripping-lever during the initial portion of the actuating stroke of the plunger; and to pass said pin without operating the tripping-lever during the return stroke of the plunger; and a swinging lever having one of its ends provided with a projection adapted to engage and restore the platen-lever, and having its other end positioned to be engaged by the plunger during the latter part of its actuating stroke.

15. The combination with a plurality of cash-drawers, of the printing-platen, mechanisms for actuating the same so as to cause it to print, and also for restoring it to normal position; a reciprocating plunger adapted and arranged to operate the printing mechanism during initial portion of its actuating stroke, and to operate the restoring mechanism during the latter part of said stroke; a device for locking all of the cash-drawers; and mechanism operable by said plunger for actuating said locking device so as to unlock said drawers.

16. The combination with a plurality of individual drawers of a locking-bar having pins arranged to enter notches or recesses formed in said drawers; a swinging lever link-connected with said locking-bar; a reciprocating plunger adapted to operate said swinging lever during its actuating stroke; a printing-platen carried by a swinging lever; spring means tending normally to actuate the platen-lever so as to cause the platen to print; a swinging support adapted to hold said platen-lever in normal position; a tripping-lever arranged to trip said swinging support; a catch on the reciprocating plunger, adapted to operate the tripping-lever during the initial portion of the actuating stroke of the plunger, and to pass the same without operating it upon the return stroke of said plunger; and a swinging lever having one of its ends provided with a projection capable of engaging and restoring the platen-lever, and having its other end positioned to be actuated by the plunger during the latter part of the actuating stroke thereof.

17. The combination with a reciprocating plunger of a locking device therefor, a sliding pin adapted to actuate said locking device so as to unlock the plunger, a rock-shaft having a cam arranged to actuate the sliding pin, and a plurality of keys each arranged to operate pins on the rock-shaft.

18. The combination of a reel, a pinion on the spindle thereof, connections between the pinion and the reel whereby the latter is rotated upon the rotation of the pinion in one direction, and is not rotated upon the rotation of the same in the reverse direction; a swinging arm having its end provided with a toothed arc adapted to engage the pinion on the reel-spindle; means for swinging said arm in a way to turn the pinion without turning the reel; spring means for returning the arm in a direction to turn the reel; and means for supporting the arm in its initial position.

19. The combination with a swinging lever carrying the printing-platen, of feed-wheels whereof one is provided with a loose ratchet engaging a pawl connected to the feed-wheel; a pinion secured to said ratchet and meshing with the rack pivotally connected to the end of the printing-platen; a reel provided with a couple of ratchets one of which engages a pawl attached to the reel, and the other a fixed catch; a pinion secured to the ratchet-wheel which is engaged by the pawl on the reel; a swinging arm having a toothed arc meshing with said pinion; a projection on the platen-lever for elevating said swinging arm; and a spring for lowering said arm.

20. The combination of type-wheels having types adapted to designate the number of the operation of the machine; a swinging arm having a pawl adapted to engage a ratchet on one of said wheels; a rock-shaft having a rocker-arm link-connected with said swinging arm; and a reciprocating plunger combined with mechanism for rocking said rock-shaft.

21. The combination with a plurality of individual keys, of devices for identifying the users of such keys; means for setting the proper identifying device for record upon the actuation of its corresponding key; mechanism for forming a record from such identifying device; and mechanism for restoring said device to its normal position during the operation in which the record is formed but subsequent to the act of forming the same.

22. The combination with a plurality of individual drawers of means for partially unlocking any one of said drawers, and additional means for wholly unlocking the same, and means for automatically restoring to normal condition the mechanism for partially unlocking the drawer, upon the actuation of the mechanism for wholly unlocking it.

23. The combination with a plurality of individual drawers, of a couple of locking devices for each drawer; a corresponding number of individual keys; mechanism for actuating one of said locking devices upon the actuation of one of said keys; means for actuating the other locking device by a separate operation; and mechanism for restoring the first locking device to its normal condition upon the actuation of the second one.

24. The combination with a plurality of individual keys and with a plunger, of a rock-shaft combined with mechanism whereby it is rocked upon the actuation of any one of said keys; means for holding the rock-shaft in a rocked position; and means for releasing the means for holding the rock-shaft in a rocked position upon the operation of the plunger.

25. A cash-register comprising a plurality of individual cash-drawers; mechanism for simultaneously preparing for record the identity of the operator, and partially unlocking the individual drawer thereof; mechanism for simultaneously indicating, registering and preparing for record the amount of the transaction; and mechanism for forming the record and completely unlocking said drawer.

26. A cash-register comprising a plurality of individual cash-drawers; independent locking devices therefor; a corresponding number of individual keys or actuators which are detachable and dissimilar; types adapted to designate the user of each key or actuator; mechanism for actuating the corresponding type and independent locking device upon the actuation of each key; mechanism for indicating and registering the amount of each transaction; types adapted to print such amounts; means for setting such types upon the indication of such amounts; a common locking device for all the drawers; and mechanism for simultaneously actuating said common locking device and for printing one or more records from such types.

27. The combination with the rotary screw carrying a pointer; of a tabular computer arranged so that the pointer moves along it; indicators and a register; and mechanism whereby the computation of value by the pointer automatically sets the corresponding indicators, and registers the corresponding amount upon the register.

28. The combination with a tabular computer; of a rotary screw carrying a pointer movable along the computer; a register and printing-types; and mechanism whereby the computation of value by the pointer automatically sets the corresponding types and registers the corresponding amount upon the register.

29. The combination with a tabular computer; of a rotary screw carrying a pointer movable along the computer; indicators; printing-types and a register; and mechanism whereby the computation of value by the pointer automatically sets the corresponding indicators and types, and registers the corresponding amount upon the register.

30. The combination with the rock-shaft provided with laterally-extending pins, of plungers arranged to act against said pins; springs holding such plungers normally in retracted position; keys for operating such plungers; a clerk's type-wheel gear connected with said rock-shaft; registering mechanism and means for operating the same; means for locking the registering mechanism in registering position; a rock-shaft having a lever adapted to actuate such locking means so as to release the registering mechanisms, said rock-shaft having a laterally-bent portion; and inclined surfaces secured to said plungers and extended below said bent portion of said rock-shaft; whereby the insertion of the key to operate the plungers, sets the clerk's type-wheel and releases the registering mechanism.

31. The combination with a plurality of cash-drawers; of a rock-shaft provided with pins; plungers adapted to strike against said pins and turn the rock-shaft; springs for holding said plungers in a retracted position; keys for operating the plungers; a type-wheel gear connected with said rock-shaft and provided with types to indicate the users of the different keys; catches on the different drawers; pins for engaging said catches so as to lock the drawers; springs holding said pins normally in locking position; blocks carried by said pins and provided with inclined surfaces; pins on said plungers adapted to slide below said inclined surfaces and thereby elevate the locking-pins and unlock the drawers when the corresponding special keys are operated; mechanism for indicating, registering and setting for record the amount of the transaction; a printing-platen for printing the record; a plunger combined with mechanism for operating the printing-platen upon the depression of the plunger; and a second set of locks on the drawers combined with mechanism for operating the same upon the operation of the plunger.

32. The combination with a plurality of drawers, and a plurality of corresponding keys; of a type-wheel for indicating the users of said drawers and keys, combined with mechanism for setting the type-wheel upon the operation of each of the special keys; individual locks on said drawers combined with mechanism for operating the same upon the operation of the corresponding special key; mechanism for indicating, registering and setting for record the amount of the transaction; a printing-platen for printing the record; a second set of locking devices for said drawers, actuated by a common actuating mechanism; and a hand-operated device, such as a plunger, combined with mechanism for operating the printing-platen and the common actuating device for said second set of locks.

33. The combination with a plurality of drawers, and a plurality of corresponding special keys; of locking devices for said drawers, combined with mechanism whereby the operation of any one of the special keys actuates the locking device of the corresponding drawer; a second set of locking devices for said drawers, combined with a common actuating means therefor; a hand-operated device, such as a plunger, combined with mechanism for actuating the common lock-operating device, and also with mechanism for restoring to normal condition the individual lock previously operated by its special key.

Signed by me at Chicago, Illinois, this 14th day of April, 1899.

EUGENE W. APPLEGATE.

Witnesses:
  A. MILLER BELFIELD,
  MARY F. LINCOLN.